C. C. McCOY.
CYCLE SLEIGH.
APPLICATION FILED MAR. 14, 1908.
904,351.
Patented Nov. 17, 1908.
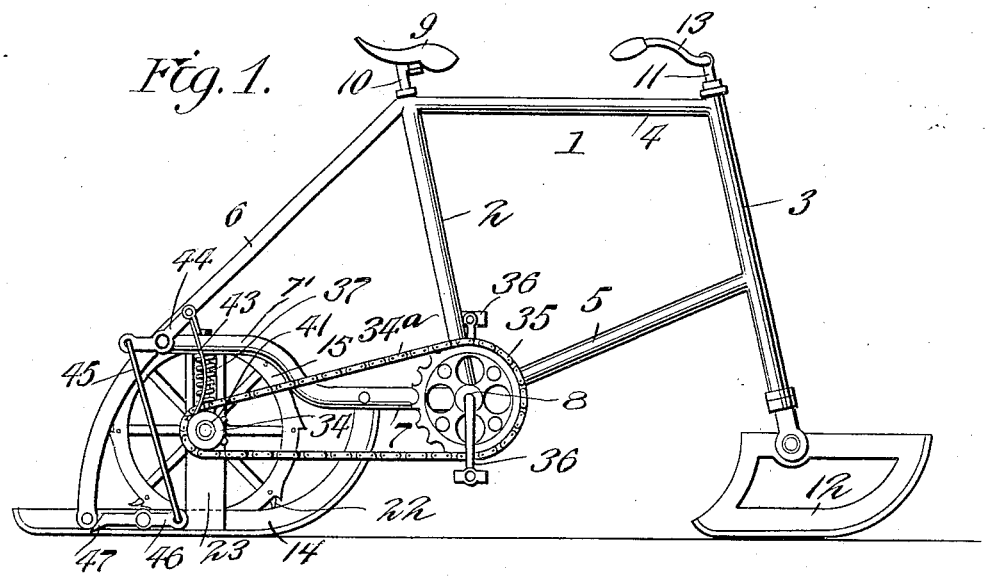
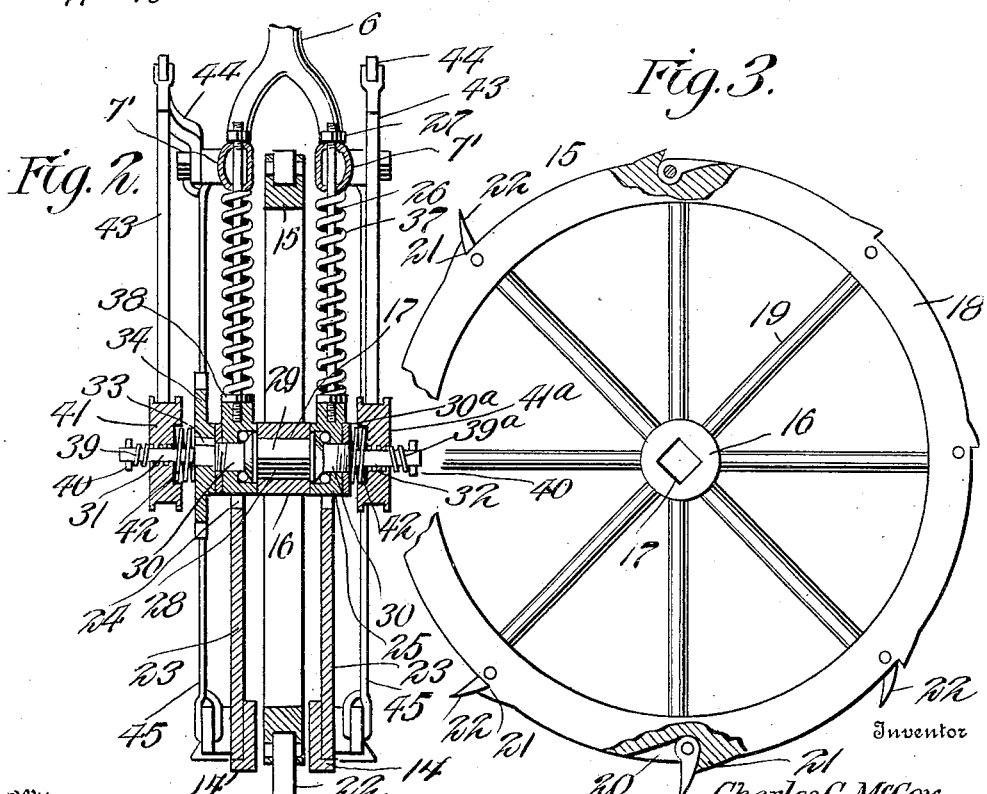
Witnesses
H. Ackman Jr.
C. C. Hines.
Inventor
Charles C. McCoy,
By Victor J. Evans
Attorney

UNITED STATES PATENT OFFICE.

CHARLES C. McCOY, OF GRAND FORKS, BRITISH COLUMBIA, CANADA.

CYCLE-SLEIGH.

No. 904,351.      Specification of Letters Patent.      Patented Nov. 17, 1908.

Application filed March 14, 1908. Serial No. 421,058.

*To all whom it may concern:*

Be it known that I, CHARLES C. McCOY, a citizen of the United States of America, residing at Grand Forks, in the Province of British Columbia and Dominion of Canada, have invented new and useful Improvements in Cycle-Sleighs, of which the following is a specification.

This invention relates to manually or motor-propelled cycle-sleighs, the object of the invention being to provide an efficient construction of snow or ice sleigh or sled of the bicycle-frame type wherein provision is made to adapt the propelling wheel to accommodate itself to inequalities of surface and bear with proper pressure against the surface of the ice or snow, and wherein said propelling wheel is provided with improved spurs or claws projected for action by gravity upon the active portion of the wheel and adapted, when not in use, to fold within the line of the periphery of the wheel.

A further object of the invention is to provide a novel and efficient brake mechanism for sleighs of this character.

The invention consists of the features of construction, combination and arrangement of parts hereinafter fully described and claimed, reference being had to the accompanying drawing, in which:—

Figure 1 is a side view of a cycle-sleigh embodying my invention, the adjacent rear runner being partially broken away to better disclose the construction. Fig. 2 is a vertical transverse section on an enlarged scale through the propelling wheel and its supporting parts. Fig. 3 is a side view of the propelling wheel.

In carrying my invention into practice, I provide a frame 1 conforming in general to the conventional construction of a bicycle frame, the same comprising the seat post tube 2, front tube 3, top run 4 connecting the upper ends of said tubes, the reach tube 5 connecting the lower ends of the tubes 2 and 3, the rear brace 6 and rear fork 7, the usual crank hanger being provided at the point of junction of the tubes 2, 5 and 7 for the reception of the bearings of the drive shaft. The rider's seat 9 is supported upon the tube 2 by the usual seat post 10, while a steering post 11 extends through the front tube 3 and carries at its lower end the front sled runner 12 and at its upper end controlling handles 13, through the medium of which the sled may be steered. The runner 12 may be of any preferred construction, and may be pivotally mounted upon the lower end of the post 11 to adapt it to have play to conform to irregularities of surface.

A pair of spaced rear runners 14 are disposed in parallel relation and connected at their upper forward ends to the upwardly offset arms 7' of the fork 7 and at their lower rear ends to the rear brace 6, said runners being substantially attached to the described frame part in any preferred manner. A propelling wheel 15 is arranged so that its lower portion is inclosed between the runners 14 and its upper portion between the said arms or sides 7' of the fork 7. The wheel comprises a hub 16 having an angular bore or opening 17, a rim 18, and a series of radial arms or spokes 19 connecting said hub and rim. Equidistantly around its surface the rim is formed with inclined or tangential pockets or recesses 20, each having at one end a shoulder 21 projecting beyond the periphery of the rim, and pivotally mounted within these recesses are spurs or claws 22 adapted to fold therein by gravity when they form portions of the inactive surface of the rim and to automatically drop to a projected position by gravity when they form portions of the working surface of the wheel. The claws upon the lower or working surface of the wheel project outwardly therefrom as shown in Fig. 3, to engage the surface of the ice or snow and are backed or sustained by the shoulders 21 while they are in operation, thus enabling the wheel to secure a firm grip and propelling action to drive the sled in an effective manner.

The runners 14 are connected about midway of their length with the fork arms 7' by vertical standards 23, suitably fixed at their upper ends to said arms and secured at their lower ends to the runners by bolts, rivets or other fastening connections. The upper portions of the standards are provided with vertical slots 24 for the reception of vertically sliding bearing blocks or members 25 carried upon the lower ends of guide rods or bolts 26, the upper ends of which pass through the fork arms 7', in which they are slidably mounted, the downward movement of said bolts being limited by nuts or heads 27. The propelling wheel is mounted upon an axle 28 having an angular portion 29 to fit the opening 17 in its hub 16 and provided with cylindrical portions 30 journaled in the bearing blocks or members 25 and reduced cylindrical end portions 31 and 32. The portions 30 are threaded at their outer ends to receive retaining nuts or washers 30ª bearing against the outer faces of the blocks 25, said blocks being hollowed at their inner sides to form cups coacting with cones on the shaft to form races for bearing balls, as shown in Fig. 2. Fixed to the end portion 31 of the axle adjacent to the adjoining portion 30, as by a key 33, is a sprocket wheel 34 connected by a drive chain 34ª with a drive sprocket 35 upon the driving shaft 8, which latter may be driven by the ordinary pedal cranks 36 or any other suitable manually or motor-propelled mechanism.

It will be seen from the foregoing description that the propelling wheel is mounted to turn with the axle 28 which rotates in the bearing blocks or members 25, which may be provided with suitable ball or anti-friction bearings, and the said blocks or bearing members are free to slide vertically in the slots 24 of the stem 23, being supported and guided in their movements by the guide rods or bolts 26, whereby the wheel is adapted to have vertical play to conform to the irregularities in the surface of the ice or snow. In order to retain the wheel in working position and to provide for a cushioning movement thereof coiled springs 37 surround the guide rods or bolts 26 between the bearing members 25 and the fork arms 15. The lower ends of the rods 26 are preferably threaded into the bearing blocks and provided with securing or jam nuts 38.

In operation, it will be understood that when motion is imparted to the driving mechanism the propelling wheel will be rotated in a forward direction and the claws 22 upon the lower working surface thereof will be automatically projected and engage the surface of the ice or snow to propel the sled forward. When inequalities of surface are encountered, the wheel is permitted to play vertically through the movement of the bearings in the guide slides 25, such action of the wheel being cushioned by the springs 37, which maintain the wheel in working position and at the same time prevent excessive jars or strains from being transmitted to the frame. The capability of the claws or spurs 22 to move within the recesses 25 provides for a self-clearing of said claws from ice and snow, by which the propelling wheel will be always maintained in a proper working condition.

The end portions 31 and 32 of the axle are respectively provided with short right and left hand threads 39 and 39ª and retaining pins or keys 40, and loosely fitted to turn on the smooth portions of said axle ends are clutch pulleys or drums 41 and 41ª pressed outwardly against the threads by expansion springs 42. These pulleys or drums are provided with threads to engage the threads 39 and 39ª, which latter tend to force the drums inward against the pressure of the springs when the axle is turning forwardly, thus preventing the drums from being clutched to the axle in the normal movement of the sleigh. When, however, the driving mechanism is "back-pedaled", and the axle caused to rotate rearwardly, the drums will engage and move outwardly on the threads 39 and 39ª until locked from further outward movement by the pins 40. The drums are connected by means of straps 43 with bell crank levers 44 pivoted on the frame, which levers are connected by links 45 with pivoted brake levers 46 having spurs 47 to engage the ice or snow. When the drums are rotated rearwardly by a partial backward rotation of the axle and wheel, the straps are partially wound thereon, whereby the brakes will be projected in an obvious manner. When the wheel is again propelled forwardly the axle threads will move the drums inwardly and forwardly and break the clutch-connection, by which the brakes will be retracted. By means of this brake mechanism the speed of the sleigh may be readily controlled.

Having thus fully described the invention, what is claimed as new is:—

1. A cycle-sleigh embodying a frame including a rear fork having upwardly offset arms, a steering runner and operating means therefor mounted upon the front of the frame, spaced rear runners secured to the rear portion of the frame, slotted guide standards connecting said runners with the said offset fork arms, bearing blocks vertically movable in the slots in the standards, an axle carried by said bearing members, a propelling wheel carried by the axle and disposed on a line between the runners and offset fork arms, guide rods fixed at their lower ends to the bearing members and slidably extended at their upper ends through the said offset fork arms, adjusting nuts upon the upper ends of the rods adapted to engage the fork arms, and coiled cushioning springs surrounding said rods between the bearing members and the fork arms.

2. A cycle-sleigh comprising a frame provided with front and rear runners, means for steering the front runner, an axle upon the rear portion of the frame having extended ends provided with right and left hand threads, a propelling wheel journaled on said axle, drums upon the ends of the axle provided with threads to engage the threads thereon, the said threads on the axle operating normally when the wheel is rotating forwardly to force said drums inward and out of engagement therewith, springs disposed about the ends of the axle and bearing against the drums to force the latter outwardly against said threads, pivoted brake devices mounted upon the runners, bell crank levers mounted upon the frame and connected with said brake devices, and straps connecting said bell crank levers with the drums.

In testimony whereof I affix my signature in presence of two witnesses.

CHARLES C. McCOY.

Witnesses:
MARY B. HICKEY,
A. C. SUTTON.